United States Patent
Eriksson et al.

(10) Patent No.: US 8,977,688 B2
(45) Date of Patent: *Mar. 10, 2015

(54) METHODS AND SYSTEMS FOR PAUSING AND RESUMING A MEETING SESSION

(71) Applicant: BlackBerry Limited, Waterloo (CA)

(72) Inventors: Marcus Eriksson, Malmo (SE); Svante Magnus Ulfstand Hallerstrom Sjostedt, Malmo (SE); Mathias Lewin, Malmo (SE); Dan Zacharias Gardenfors, Malmo (SE)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/163,777

(22) Filed: Jan. 24, 2014

(65) Prior Publication Data

US 2014/0143340 A1 May 22, 2014

Related U.S. Application Data

(63) Continuation of application No. 13/404,057, filed on Feb. 24, 2012, now Pat. No. 8,682,974.

(51) Int. Cl.
  *G06F 15/16* (2006.01)
  *H04L 29/06* (2006.01)
  *G06F 15/173* (2006.01)
  *H04L 12/18* (2006.01)

(52) U.S. Cl.
  CPC ...... *H04L 65/1069* (2013.01); *G06F 15/17306* (2013.01); *H04L 65/4038* (2013.01); *H04L 12/1831* (2013.01)
  USPC ........................................ 709/204

(58) Field of Classification Search
  CPC .................................. H04L 12/1813–12/1831
  USPC .................................................. 709/204–207
  See application file for complete search history.

(56) References Cited

U.S. PATENT DOCUMENTS

| | | | |
|---|---|---|---|
| 6,298,319 | B1 | 10/2001 | Heile et al. |
| 2002/0002584 | A1 | 1/2002 | Takagi et al. |

(Continued)

FOREIGN PATENT DOCUMENTS

| | | |
|---|---|---|
| CA | 2807159 A1 | 8/2013 |
| EP | 2632182 A1 | 8/2013 |

OTHER PUBLICATIONS

Office Action dated May 30, 2013, issued in U.S. Appl. No. 13/404,057, (14 pages).

(Continued)

*Primary Examiner* — Brendan Higa
(74) *Attorney, Agent, or Firm* — Fish & Richardson P.C.

(57) ABSTRACT

Presented are systems and methods for presenting, creating, and pausing a meeting session. The systems and methods create meeting-session data based at least in pan on one or more applications running on one or more devices connected to a meeting session. The systems and methods store muting-session data in a database. The systems and methods pause a meeting session such that the one or more devices are disconnected from the meeting session. The systems and methods resume a meeting session by configuring devices to run at least one of the one or more applications using the meeting-session data and joining configured devices to the resumed meeting session.

20 Claims, 9 Drawing Sheets

(56) References Cited

U.S. PATENT DOCUMENTS

| | | |
|---|---|---|
| 2003/0154238 A1 | 8/2003 | Murphy et al. |
| 2003/0167339 A1 | 9/2003 | Zhu et al. |
| 2003/0225890 A1 | 12/2003 | Dunstan et al. |
| 2007/0011231 A1 | 1/2007 | Manion et al. |
| 2009/0089683 A1 | 4/2009 | Thapa |
| 2009/0119737 A1 | 5/2009 | Periman et al. |
| 2009/0138609 A1 | 5/2009 | Anderson et al. |
| 2009/0179752 A1 | 7/2009 | Patel et al. |
| 2009/0327425 A1 | 12/2009 | Gudipaty |
| 2010/0216402 A1 | 8/2010 | Appleby et al. |
| 2010/0316207 A1 | 12/2010 | Brunson |
| 2011/0239133 A1 | 9/2011 | Duffus et al. |
| 2011/0267419 A1 | 11/2011 | Quinn et al. |
| 2011/0314124 A1 | 12/2011 | Gimson |
| 2011/0320626 A1 | 12/2011 | Wong et al. |
| 2013/0038673 A1 | 2/2013 | Hiller et al. |
| 2013/0227096 A1 | 8/2013 | Eriksson et al. |

OTHER PUBLICATIONS

Notice of Allowance dated Oct. 25, 2013, issued in U.S. Appl. No. 13/404,057, (7 pages).

Extended European Search Report dated Jul. 17, 2012, issued in European Application No. 12156867.9, (7 pages).

METHODS AND SYSTEMS FOR PAUSING AND RESUMING A MEETING SESSION

CROSS REFERENCE TO RELATED APPLICATIONS

This application is a continuation of U.S. patent application Ser. No. 13/404,057, entitled "Methods and Systems for Pausing and Resuming a Meeting Session," filed on Feb. 24, 2012,which is incorporated herein by reference in its entirety.

FIELD

Example embodiments relate to meeting-session systems and methods, and in particular to systems and methods for pausing and resuming a meeting session.

BACKGROUND

Mobile devices, such as smart phones and tablet computers, are increasingly used to participate in meetings where applications are being executed. Connecting mobile devices to meetings provides a variety of benefits. For example, mobile devices connected to a meeting can share notes, annotate slides, and place conference calls. Meetings, however, are sometimes put on hold to be resumed at a later time. When a meeting is resumed, it can be difficult for a user to remember which applications were running on his mobile device, and in what state such applications were in, just prior to the meeting being put on hold.

In some cases, a mobile device can have the ability to record, and later review, audio and video regarding a meeting. Although helpful, a variety of further enhancements can be made to improve the operation of a resumed meeting.

DESCRIPTION OF EXAMPLE EMBODIMENTS

Figure 1:
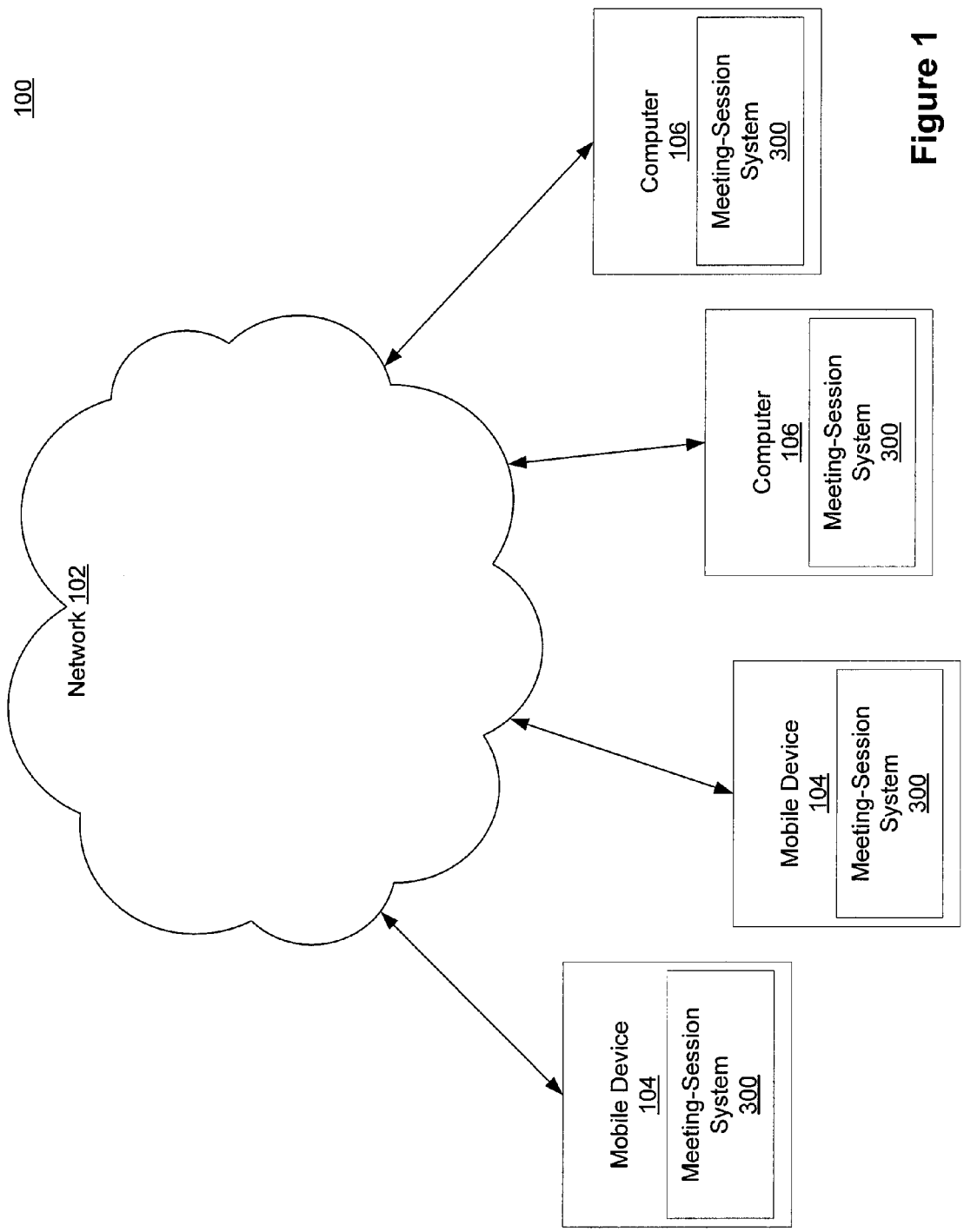
FIG. 1 is a simplified block diagram illustrating an example system utilizing a meeting-session system, in accordance with an example embodiment.

In one disclosed embodiment, a method is performed by creating meeting-session data based at least in part on one or more applications running on one or more devices connected to a meeting session. The method includes storing the meeting-session data in a database. The method further pauses the meeting session, wherein pausing the meeting session comprises disconnecting the one or more devices from the meeting session. The method further includes resuming the meeting session, wherein resuming the meeting session comprises: configuring at least one of the one or more devices to run at least one of the one or more applications using the meeting-session data and joining the configured devices to the resumed meeting session.

In another disclosed embodiment, a device is provided. The device includes one or more processors, one or more memories, and program code stored on the one or more Memories. The program code, when executed by the one or more processors, cause the device to create meeting-session data based at least in part on one or more applications running on one or more devices connected to a meeting session, store the meeting-session data in a database, pause the meeting session, wherein pausing the meeting session comprises disconnecting the one or more devices from the meeting session, and resume the meeting session, wherein resuming the meeting session comprises: configuring at least one of the one or more devices to run at least one of the one or more applications using the meeting-session data, and joining the configured devices to the resumed meeting session.

In another disclosed embodiment, a device is provided. The device includes one or more processors configured to execute modules and one or more memories storing the nodules. The modules comprise a data storage and retrieval module configured to communicate with a database, a state monitoring module configured to monitor one or more applications, and control module configured to communicate with the data storage and retrieval module and the state monitoring module. The control module is further configured to create meeting-session data based at least in part on the one or more applications running on one or more devices connected to a meeting session, store the meeting-session data in the database, pause the meeting session, wherein pausing the meeting session comprises disconnecting the one or more devices from the meeting session, and resume the meeting session, wherein resuming the meeting session comprises: configuring at least one of the or more devices to run at least one of the one or more applications using the meeting-session data, and joining the configured de ices the resumed meeting session.

The following detailed descriptions refers to the accompanying drawings. Wherever possible, the same reference numbers are used in the drawings and the following description to refer to the same or similar parts. While several example embodiments are described herein, modifications, adaptations, and other implementations are possible. For example, substitutions, additions, or modifications can be made to the components illustrated in the drawings, and the example methods described herein can be modified by substituting, reordering, or adding steps to the disclosed methods. Accordingly, the foregoing general description and the following detailed description are example and explanatory only and tare not limiting. Instead, the proper scope is defined by the appended claims.

In addition, numerous specific details are set forth in order to provide a rough understanding of the example embodiments described herein. It will, however, be understood by those of ordinary skill in the art that the example embodiments described herein can be practiced without these specific details. Furthermore, well-known methods, procedures, and components have not been described in detail so as not to obscure the example embodiments described herein.

Reference is now made to FIG. 1, which shows, in block diagram form, an example system 100 utilizing a meeting session system 300 for pausing and resuming a meeting session, for the control and management of communications. System 100 includes a network 102 that enables as plurality of devices to exchange data. Network 102 can be any type of network capable of enabling a plurality of devices to exchange data such as, for example, a local area network (LAN), such as a wireless local area network (WLAN), a Bluetooth connection, a wide area network (WAN) 115, a publics-switched telephone network (PSTN), or a public-land mobile network (PLMN) 120, which is also referred to as a wireless wide area network (WWAN) or, in some cases, a cellular network. In addition, network 102 can comprise a plurality of the aforementioned network types coupled via appropriate methods that are known in the art.

System 100 can include a number o devices, for example, mobile devices 104, coupled to the network 102. Mobile devices 104 can include devices equipped for cellular communication through PLMN or PSTN, mobile devices equipped for Wi-Fi communications over WLAN or WAN, or dual-mode devices capable of both cellular and Wi-Fi communications. In addition to cellurar and Wi-Fi communications, mobile devices 104 can also be equipped for Bluetooth communications. Mobile devices 104 can be, for example, cellular phones, smartphones, tablets, netbooks, laptops, and personal digital assistants (PDAs) enabled for wireless communication. Mobile devices 104 are described in detail below in FIG. 2.

System 100 can also include a number of computers, for example, computers 106, coupled to the network 102. Computers 106 can include any device equipped for communicating over LAN, WLAN, Bluetooth, WAN, PSTN, PLMN, or any combination thereof. For example, computers 106 can be a server or a desktop computer. While FIG. 1 illustrates the system 100 as having two mobile devices 104 and two computers 106, the depicted number of mobile devices 104 and computers 106 is for illustrative purposes only. System 100 can comprise one or more mobile devices 104, computers 106, or a combination thereof.

In various embodiments, mobile devices 104 are configured to operate in compliance with any one or more of a number of wireless protocols, including GSM, GPRS, CDMA, EDGE, UMTS, EvDO, HSPA, 3GPP, or a variety of others. It will be appreciated that mobile devices 104 can roam within and across PLMNs in known manner, as their user moves. In some instances, mobile devices 104 are configured to facilitate roaming between PLMNs and WLANs or WANs, and are thus capable of seamlessly transferring sessions from a coupling with the cellular interface to as WLAN or WAN interface, and vice versa.

Each mobile device 104 possesses the ability to act as a mobile bridge. For example, one or more devices could connect to a mobile device acting as a mobile bridge using Bluetooth connections or a WEAN created by the mobile device acting as a mobile bridge.

Meeting-session, system 300 can include one or more processors (not shown), a memory (not shown), and a data interface (not shown). The processor(s) can be a single or multiple microprocessors, field programmable gate arrays (FPGAs), or digital signal processors (DSPs) capable of executing particular sets of instructions. Computer-readable instructions can be stored on, a tangible non-transitory computer-readable medium, such as a flexible disk, a hard disk, a CD-ROM (compact disk-read only memory), and MO (magneto-optical), to DVD-ROM (digital versatile disk-read only memory), a DVD RAM (digital versatile disk-random access memory), or a semiconductor memory. Alternatively, the methods can be implemented in hardware components or combinations of hardware and software such as, for example, ASICs, special purpose computers, or general purpose computers. Meeting-session system 300 can be implemented on a mobile device, a single computer, distributed across a plurality of computers, or some combination thereof.

Figure 2:
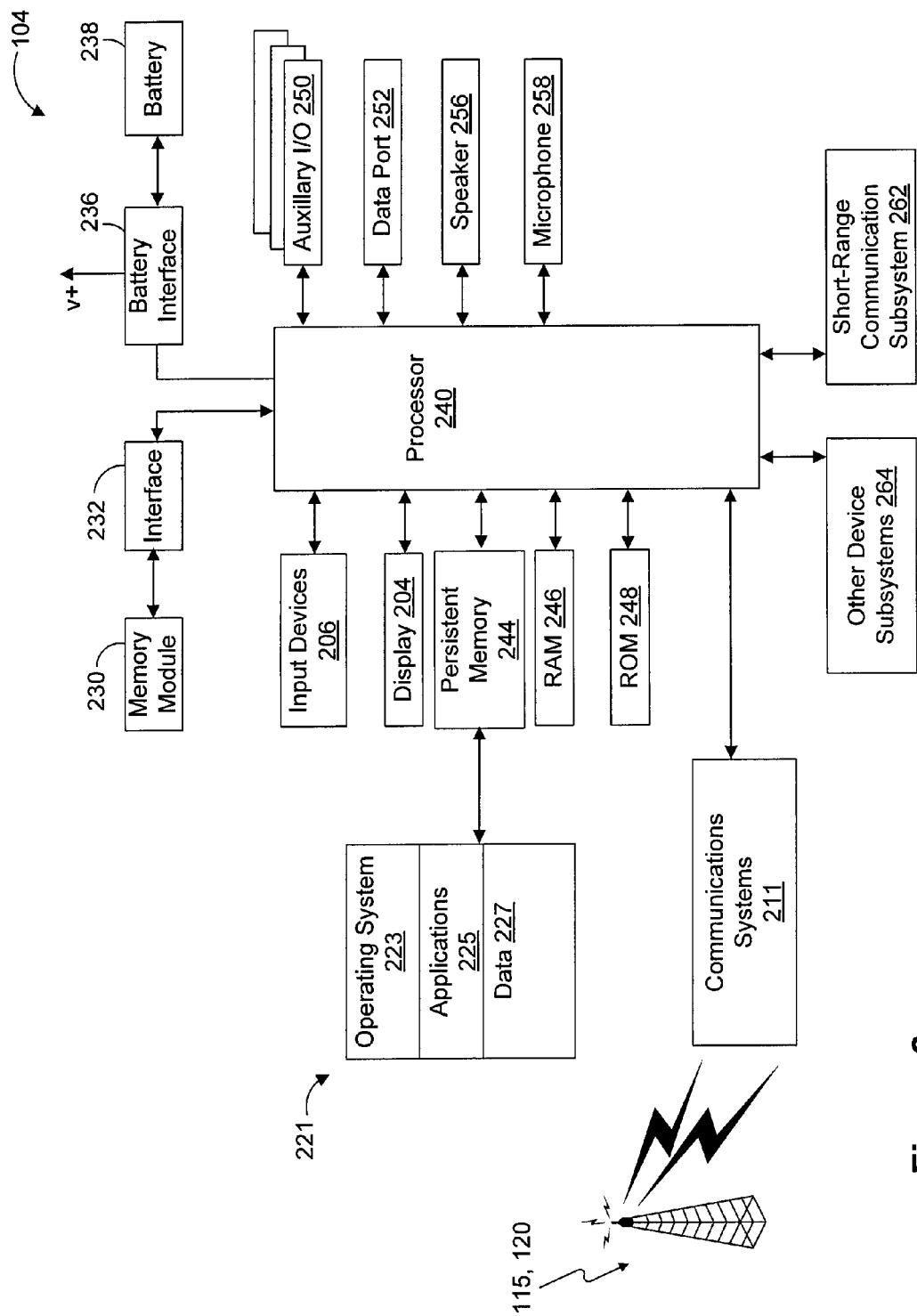
FIG. 2 is a simplified block diagram illustrating an example mot mobile communication device, in accordance with an example embodiment.

Reference is now made to FIG. 2, which illustrates in detail mobile device 104 in which example embodiments can be applied. Mobile device 104 is a two-way communication device having data- and voice-communication capabilities, and the capability to communicate with other computer systems, for example, via the Internet. Depending on the functionality provided by mobile device 104, in various embodiments mobile device 104 can be a handheld device, a multiple-mode communication device configured for both data and voice communication, a smartphone, a mobile telephone, a laptop, a tablet, or a PDA enabled for wireless communication.

Mobile device 104 includes a rigid case (not shown) housing the components of mobile device 104. The internal components of mobile device 104 can, for example, be constructed on a printed circuit board (PCB). The description of mobile device 104 herein mentions a number of specific components and subsystems. Although these components and subsystems can be realized as discrete elements, the functions of the components and subsystems can also be realized by integrating, combining, or packaging one or more elements in any suitable fashion.

Mobile device 104 includes a controller comprising at least one processor 240 (such as a microprocessor), which controls the overall operation of mobile device 104. Processor 240 interacts with device subsystems such as a communication systems 211 for exchanging radio frequency signals with the wireless network (for example WAN 115 or PLMN 120) to perform communication functions. Processor 240 interacts with additional device subsystems including a display 204 such as a liquid crystal display (LCD) screen or any other appropriate display, input devices 206 such as a keyboard and control buttons, persistent memory 244, random access memory (RAM) 246, read only memory (ROM) 248, auxiliary input/output (I/O) subsystems 250, data port 252 such as a conventional serial, data port or a Universal Serial Bus (USB) data port, speaker 256, microphone 258, short-range communication subsystem 262 (which can employ any appropriate wireless (for example, RF), optical, or other short range communications technology), and other device subsystems generally designated as 264. Some of the subsystems shown in FIG. 2 perform communication-related functions, whereas other subsystems can provide "resident" or on-device functions.

Display 204 can be realized as a touch-screen display in some embodiments. The touch-screen display can be constructed using a touch-sensitive input surface coupled to an electronic controller and which overlays the visible element of display 204. The touch-sensitive overlay and the electronic controller provide a touch-sensitive input device and processor 240 interacts with the touch-sensitive overlay via the electronic controller.

Communication systems 211 includes one or more communication systems for communicating with wireless WAN and wireless access points within a wireless network. The particular design of communication systems 211 depends on the wireless network in which mobile device 104 is intended to operate. Mobile device 104 can send and receive communication signals over the wireless network after the required network registration or activation procedures have been completed.

Processor 240 operates under stored program control and executes software modules 221 stored in memory such as persistent memory 244 or ROM 248. Processor 240 can execute code means or instructions. ROM 248 can contain data, program instructions or both. Persistent memory 244 can contain data, program instructions, or both. In some embodiments, persistent memory 244 is rewritable under control of processor 240, and can be realized using, any appropriate persistent memo technology, including EEPROM, EAROM, FLASH, and the like. As illustrated in FIG. 2, software modules 221 can include operating system software 223. Additionally, software modules 221 can include software applications 225.

In some embodiments, persistent memory 244 stores user-profile information, including, one or more meeting-session connection information items, such as, for example, dial-in telephone numbers or IP addresses. Persistent memory 244 can additionally store identifiers related to particular meeting-session participants. Persistent memory 244 can also store information relating to various people, for example, name of a user, a user's identifier (user name, email address, or any other identifier), place of employment, work phone number, home address, etc. Additionally, persistent memory 244 can additionally store meeting-session details parsed from one or more calendar events. Meeting-session details can include, for example, meeting-session subject information, meeting-session connection in formation, and date/time of as meeting session. In some embodiments, persistent memory 244 can store is database (e.g., database 340 of FIG. 3) that meeting-session system 300 can reference to obtain data regarding past meeting sessions. In some embodiments, the database can be stored in the persistent memory 244 of some or all of the mobile devices in system 100. Alternatively, or additionally, the database can be stored in a computer 106, such as, for example, a server or a desktop computer.

Software modules 221, for example, meeting-session system 300, or parts thereof can be temporarily loaded into volatile memory such as RAM 246. RAM 246 is used for storing runtime data variables and other types of data or information. In some embodiments, different assignment of functions to the types of memory could also be used.

Software applications 225 can further include a range of applications, including, for example, an application related to meeting-session system 300, an e-mail messaging application, an address book, a calendar application, a meeting-sessions application, a dialer application, a notepad application, an Internet browser application, a voice communication (i.e., telephony) application, a mapping application, or a media player application, or any combination thereof.

In some embodiments, auxiliary input/output (I/O) subsystems 250 comprise an external communication link or interface, for example, an Ethernet connection. In some embodiments, auxiliary ISO subsystems 250 can further comprise one or mom input devices, including a pointing or navigational tool, or one or more output devices, including, as a mechanical transducer such as a vibrator for providing vibratory notifications in response to various events on mobile device 104 (for example, receipt of an electronic message or incoming phone call), or for other purposes such as haptic feedback (touch feedback).

In some embodiments, mobile device 104 also includes one or more removable memory modules 230 (typically comprising FLASH memory) and one or more memory module interfaces 232. Among possible functions of removable memory module 230 is to store information to information used to identify or authenticate a user or the user's account to a wireless network (for example WAN or PLMN). For example, in conjunction with certain types of wireless networks, including GSM and successor networks, removable memory module 230 is referred to as a Subscriber Identity Module or SIM. Memory module 230 is inserted, in or coupled to memory module interface 232 of mobile device 104 in order to operate in conjunction with the wireless network.

Mobile device 104 stores data 227 in persistent memory 244. In various embodiments, data 227 includes service data comprising information required by mobile device 104 to establish and maintain communication with the wireless network (for example WAN or PLMN). Data 227 can also include, for example, scheduling and connection information for connecting to a meeting session. Data 227 can include device control data used by mobile device 104 for various tasks, such as, for example, to automatically connect to as meeting session, to identify user controls associated with a particular meeting system, to classify a meeting-session type parameter, to execute user controls, to provide moderator control over a meeting session to mobile device 104 when mobile device 104 acts as a moderator device, to provide one or more controls to a user of mobile device 104 when participating in a meeting session, to provide meeting-session details to the calendaring application or the meeting-sessions application, etc.

Mobile device 104 also includes a battery 238, which furnishes energy for operating mobile device 104. Battery 238 can be coupled to the electrical circuitry of mobile device 104 through a battery interface 236, which can manage such functions as charging battery 238 from an external power source (not shown) and the distribution of energy to various loads within or coupled to mobile device 104. Short-range communication subsystem 262 is an additional optional component that provides for communication between mobile device 104 and different systems or devices, which need not necessarily be similar devices. For example, short-range communication subsystem 262 can include an infrared device and associated circuits and components, or a wireless bus protocol compliant communication mechanism such as a Bluetooth communication module to provide for communication with similarly-enabled systems and devices.

A predetermined set of applications that control basic device operations, including data and possibly voice communication applications can be installed on mobile device 104 during or after manufacture. Additional applications or upgrades to operating system software 223 or software applications 225 can also be loaded Onto mobile device 104 through the wireless network for example WAN or PLMN), auxiliary I/O subsystem 250, data port 252, short-range communication subsystem 62, or other suitable subsystem such as 264. The downloaded programs or code modules can be permanently installed, for example, written into the program memory (for example persistent memory 244), or written into and executed from RAM 246 for execution by processor 240 at runtime.

Mobile device 104 can provide three principal modes of communication: a data communication mode, a voice communication mode, and a video communication mode, In the data communication mode, a received data signal such as a text message, an e-mail message. Web page download, or an image file are processed by communication systems 211 and input to processor 240 for further processing. For example, a downloaded Web page can be further processed by a browser application, or an e-mail message can be processed by an e-mail message messaging application and output to display 204. A user of mobile device 104 can also compose data items, such as e-mail messages, for example, using the input devices in conjunction with display 204. These composed items can be transmitted through communication systems 211 over the wireless network (for example WAN or PLMN). Data communication mode can also enable a user of mobile device 104 to send and receive data regarding an application that is being shared with another device. In the voice communication mode, mobile device 104 provides telephony functions and operates as a typical cellular phone. In the video communication mode, mobile device 104 provides video telephony functions and operates as a video teleconference term. In the video communication mode, mobile device 104 utilizes one or more cameras (not shown) to capture video of video teleconference. Additionally, in some embodiments, mobile device 104 utilizes the one or more cameras to capture video. The video can be stored as one or more video data files in persistent memory 244, RAM 248, memory module 230, or any other data storage medium.

Figure 3:
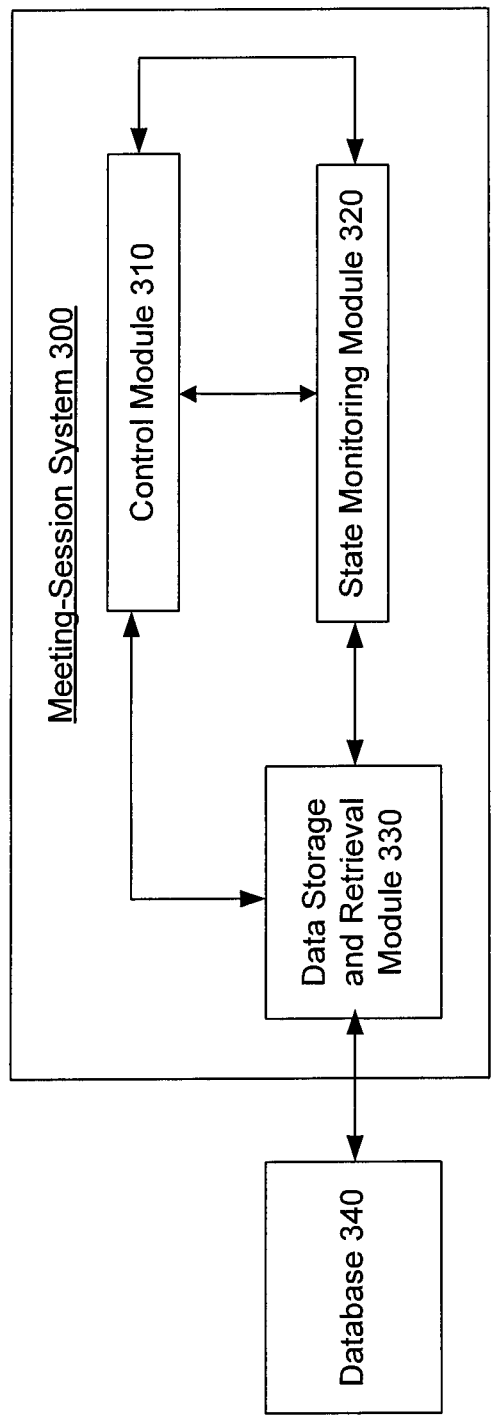
FIG. 3 is a simplified block diagram illustrating an example meeting-session system for pausing and resuming a meeting session.

FIG. 3 is a block diagram depicting example meeting-session system 300. As illustrated, meeting-session system 300 includes a control module 310, a state monitoring module 320, and a data storage and retrieval module 330. It is appreciated that one or more of these modules can be deleted, modified, or combined together with other modules.

Control module 310 monitors the calendar application, the meeting-sessions application, the location of one or more devices, or a combination thereof, to determine whether a meeting session will be initiated. For example, control module 310 can detect a selection by to user of a meeting session in the calendar application or the meeting-sessions application. In addition, control module 310 can detect that a meeting session is scheduled to begin in the calendar application or the meeting-sessions application. When control module 310 detects that a device is checking in to a meeting session, control module 310 can either create a new meeting session or join the device to an existing meeting session.

Figure 4:
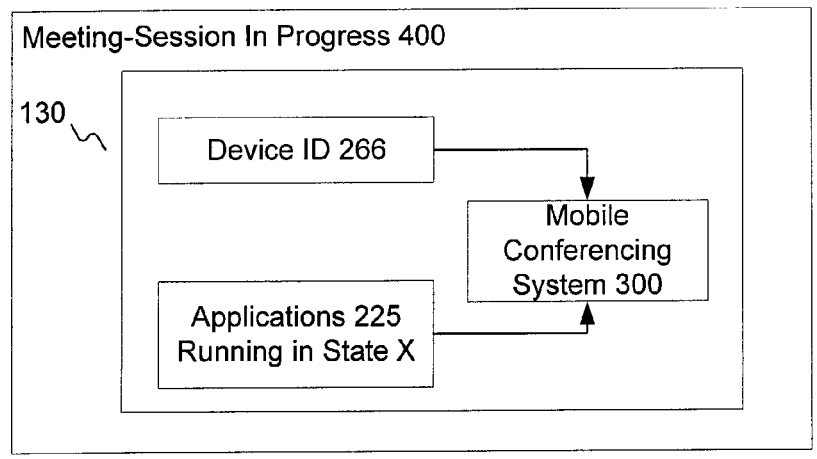
FIG. 4 is as simplified block diagram illustrating an example meeting session in progress, in accordance with an example embodiment.
Figure 5:
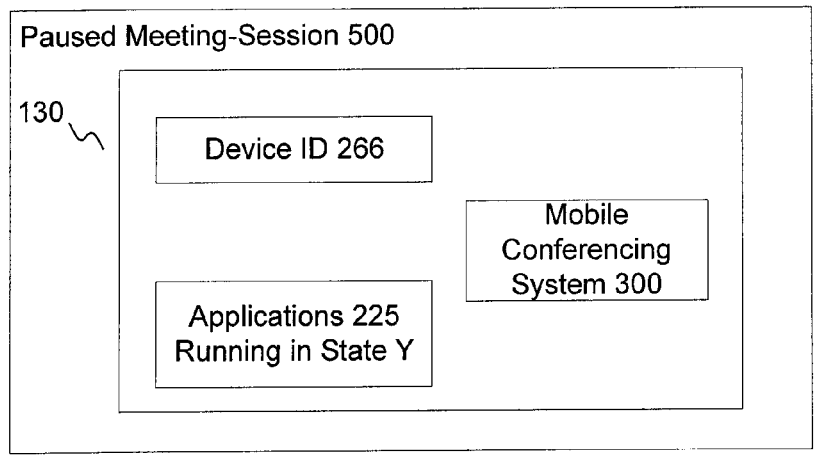
FIG. 5 is a simplified block diagram illustrating an example paused meeting session, in accordance with an example embodiment.

Control module 310 can signal to the state monitoring module 320 to monitor a device ID (e.g., device ID 266 of FIG. 4) of one or more devices connected to the meeting session, applications, and the state of the applications running on one or more devices connected to the meeting session. State monitoring module 320 can monitor the device ID of one or more devices connected to the meeting session, applications running on one or more devices connected to the meeting session, and the state of the applications just before, or while, a meeting session is being paused or periodically throughout an active meeting session. As graphically depicted in FIG. 4, when a meeting session is in progress, the mobile conference system 300 has access to the device ID 266, any one or more applications 255 that are running, and the state of the one or more running applications. Control module 310 can signal to state monitoring module 320 to transmit acquired data to data storage and retrieval module 330. Data storage and retrieval module 330 can then transmit the acquired data, along with a meeting session ID, to the database 340 to be stored as meeting-session data. Data transfers between the state monitoring module 320 and the data storage and retrieval module 330 can occur just before, or while, a meeting session is being paused or periodically throughout an active meeting session. Data transfers between the data storage and retrieval module 330 and the database 340 can occur just before, or while, a meeting session is being paused, or periodically throughout an active meeting session. Control module 310 monitors the location of one or more devices, data from one or more devices. or a combination of both to determine whether a meeting session should be paused. As graphically depicted in FIG. 5, when as meeting session is paused, the mobile conference system 300 would not need to be monitoring the device ID, the applications 255 that are running, or the state of the running applications.

Figure 6:
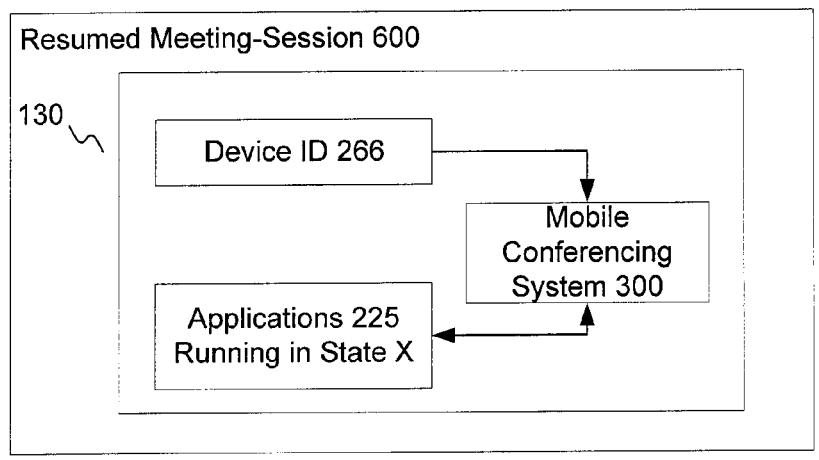
FIG. 6 is a simplified block diagram illustrating an example resumed meeting session, in accordance with an example embodiment.

Control module 310 also monitors the calendar application, the meeting-sessions application, the location of one or more devices, or a combination thereof, to determine whether a meeting session will be resumed. If control module 310 detects that a meeting session is to resume, control module 310 can signal to the data storage and retrieval module 330 to retrieve from the database 340 the meeting-session data previously stored. The control module 310 can then configure one or more devices using the retrieved meeting-session data. As graphically depicted in FIG. 6 after a resumed meeting session is in progress, the mobile conference system 300 configures the applications 255 to run in a certain state, and then have access to the device ID 266, to the one or more applications 255 that are running, and to the state of the one or more running applications.

Figure 7:
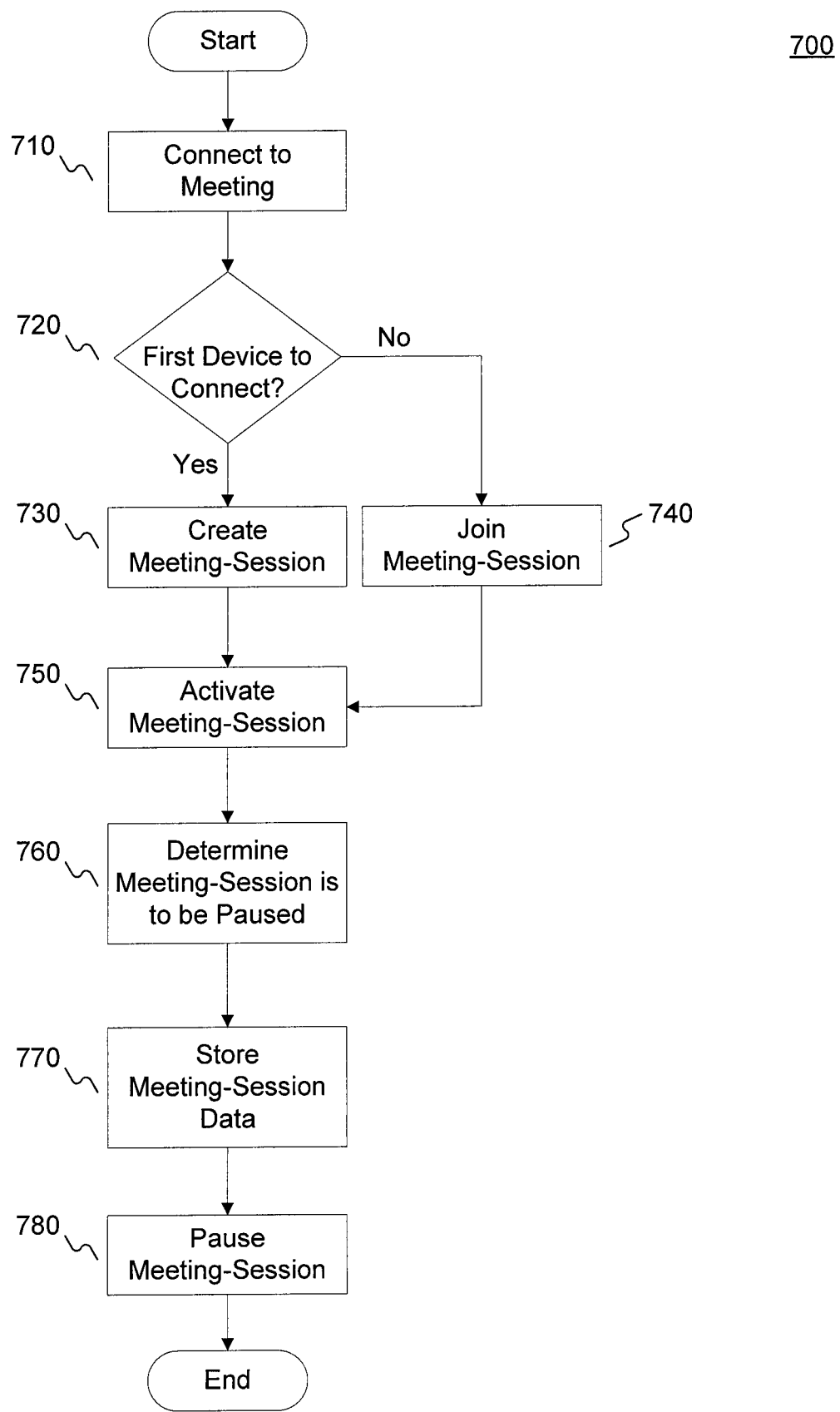
FIG. 7 is a flow diagram of an example method for creating, connecting to, and pausing as meeting session, in accordance with an example embodiment.

Reference is now made to FIG. 7, which illustrates an example method 700 for creating, connecting to, and pausing a meeting, session, in accordance with an example embodiment. The method begins by connecting to a meeting (step 710). A determination to connect to a meeting can be made a number of ways. In some embodiments, a user of a device (for example, mobile device 104 or computer 106) has the ability to access a calendar application or a dedicated meeting-sessions application and select a scheduled meeting session. In addition, in some embodiments, an ad-hoc meeting can be created that was not scheduled, by, for example, inviting one or more devices to attend a meeting. In some embodiments, location data can be used to restrict access to a meeting to devices within a certain region. In addition, location data can also be used to invite devices within a certain region to connect to a meeting.

After a device connects to a meeting, a determination is made as to whether the device is the first device to connect (step 720). If the device connecting to the meeting is the first device, a meeting session is created (step 730). Creation of a meeting session can include creation of a meeting-session ID to identify the meeting session in the future, along with creation of a database (for example, database 340) to store data pertaining to the meeting session. In some other embodiments, the meeting-session ID and database could be created later, so long as the meeting-session ID and database are created before data is transmitted to the database. Further, in some embodiments, the same database could be shared by multiple past or present meeting sessions such that a new database would not have to be created for each meeting session, whereas in other embodiments, a database could be created for each meeting session. Further, in some embodiments, the meeting-session ID, the database, or both is created in advance of meeting. The database could be stored either on a server or on a device that connects to the meeting session. If the device connecting to the meeting is not the first device, the device joins the meeting Session without creating a new meeting session (step 740). In alternative embodiments, the database, the meeting-session ID, or both will only be created after a specific device, such as a moderator device, that is not necessarily the first device, connects to the meeting session.

After a device has created or joined a meeting session, meeting session is activated (step 750). During an active meeting session, devices connected to the meeting session can share applications, audio data, video data, or any other type of data. For example, devices connected to as meeting session could share a slide show application such that each device views the same slide at a given time. It is not necessary, however, that each device in a meeting session share every application. For example, as moderator device, could run a slide-show application and only share the video and audio data with other devices in the meeting session. Further, the meeting session could be configured such that only a subset of the devices connected to a meeting session share a given application or data.

Figure 11:
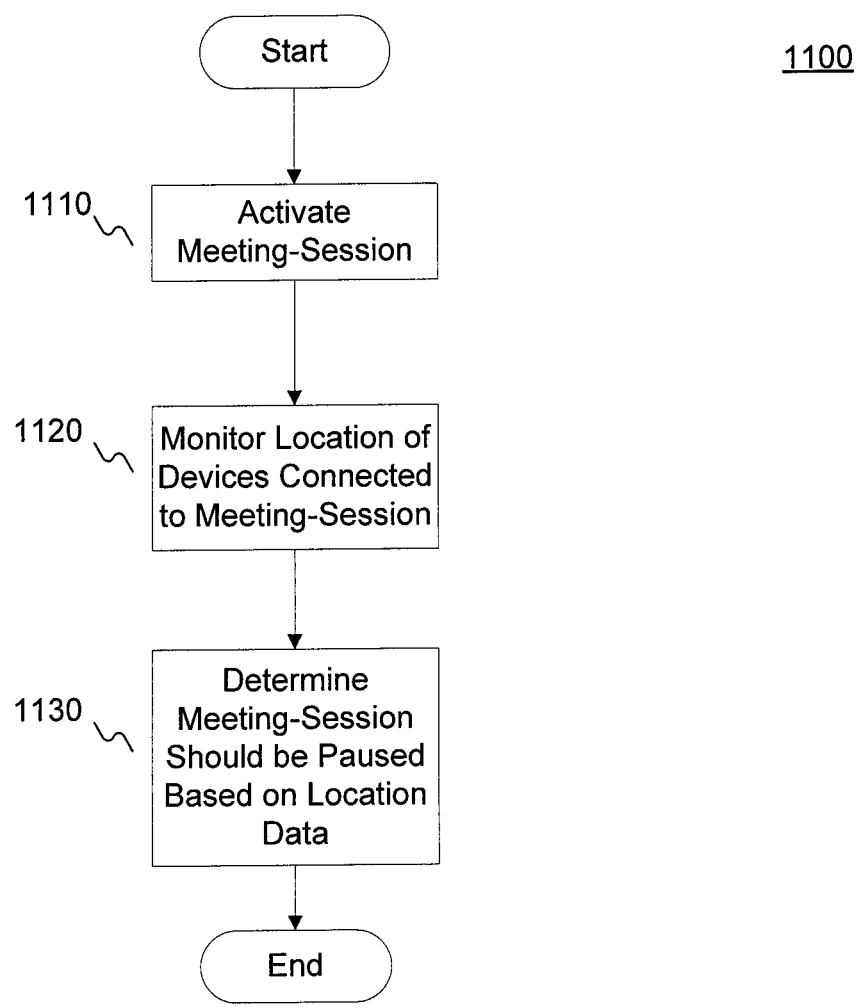
FIG. 11 is a flow diagram of an example method for pausing a meeting session, in accordance with an example embodiment.

At some point during an active meeting session, a determination is made to pause the meeting session (step 760). Such a determination can be made a number of ways. For example one or more devices in a meeting session can be allowed to manually pause the meeting session. in some embodiments, only one or more moderators of the meeting session has the ability to manually pause the meeting session, whereas in other embodiments any device connected to the meeting session could have the ability to pause the meeting session. In addition, as depicted in the method 1100 of FIG. 11, location data of one or more devices in a meeting session could be utilized to determine when to pause a meeting session (steps 1110-1130). For example, if it is detected that one or more devices have moved a predetermined distance, the meeting session can be paused. Using location data to pause a meeting could be applied to both local meetings, where all of the devices connected to a meeting session are within a certain region, and non-local meetings, since movement in either scenario can reflect that meeting participants are at least temporarily stopping the meeting.

When it is determined to pause the meeting session, meeting-session data is transferred to the database responsible for storing meeting-session data (step 770). The stored meeting-session data can include one or more of the device IDs of the devices connected to the meeting session at the time the meeting session is paused, applications running in the meeting, session at the time the meeting session is paused, and the state of the applications running in the meeting session at the time the meeting session is paused. The stored meeting-session data can also be linked to a meeting-session ID to help identify the meeting-session data. In some embodiments, only data pertaining to applications shared by all devices connected to the meeting session is stored. In other embodiments, data pertaining to applications not necessarily shared by all devices connected to the meeting session is also stored. In such embodiments where data pertaining to non-globally shared applications is stored, the data pertaining to non-globally shared applications can be linked to the one or inure device IDs representative of the one or more devices running the applications.

Once meeting-session data is stored, the meeting session can be paused (step 780). During a paused meeting session, the devices previously connected to the meeting session are not connected to the meeting session. When, a device disconnects from a meeting session, the device can store the meeting-session ID if the meeting session ID was not previously stored.

Figure 8:
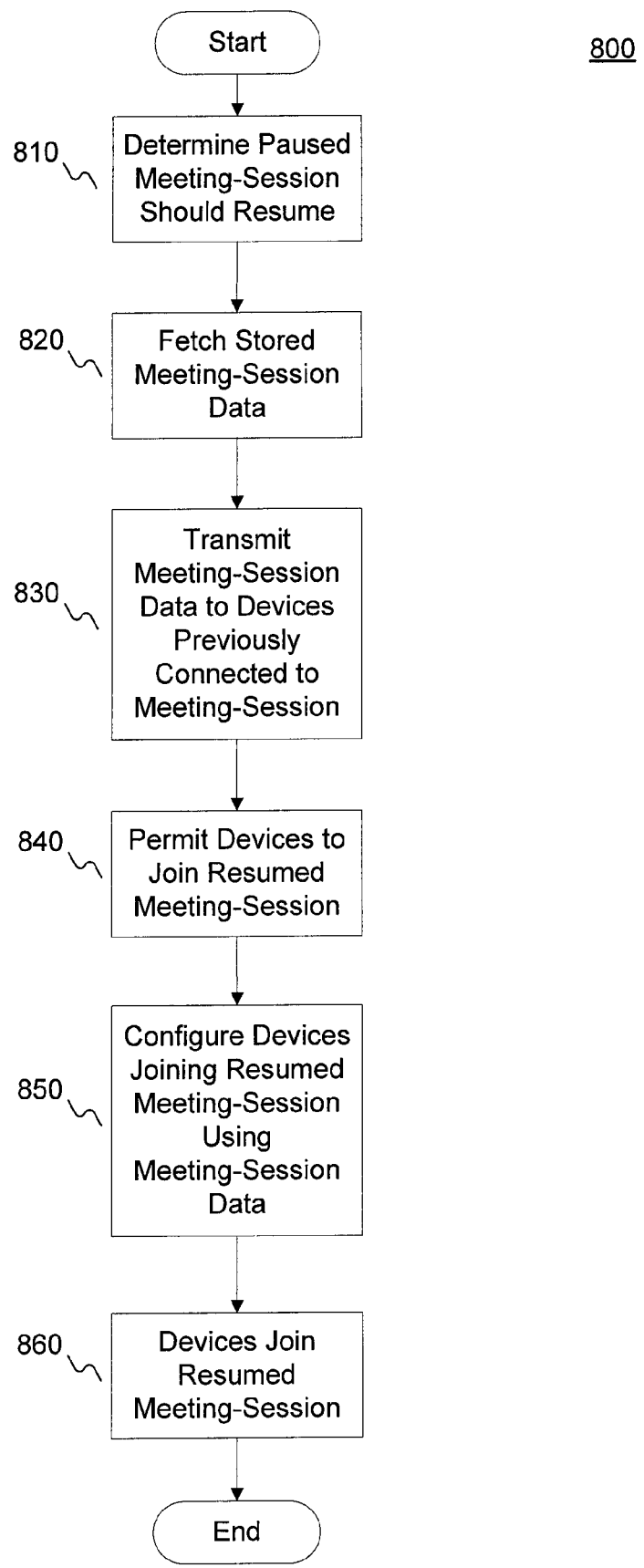
FIG. 8 is a flow diagram of an example method for resuming as paused meeting session, in accordance with an example embodiment.

Reference is now made to FIG. 8 which illustrates an example method 800 for resuming a paused meeting session, in accordance with an example embodiment.

Initially, a determination is made that a paused meeting session should be resumed (step 810). For example, one or more devices previously connected to a meeting session can signal via a calendar application or a meeting-sessions application the meeting session is to be resumed. In some embodiments, only a subset of the devices, such as moderator devices, previously connected to a meeting session can signal to resume a meeting session. In other embodiments, any device previously connected to a meeting session can signal to resume a meeting session.

When it is determined that a meeting session is to be resumed, some or all of the meeting-session data previously stored is fetched (step 820). For example, the meeting-session ID can be used to locate the meeting-session data in a database (for example, database 340) stored locally on the device signaling to resume a meeting session or stored on a server. The meeting-session data could then be transmitted to the devices previously connected to the meeting session utilizing the stored device IDs (whereby, for example, the device IDs could be, or could be linked to, device phone numbers or device IP addresses) (step 830).

When a device receives meeting-session data, it can be given the option of whether to join the meeting session (step 840). For example, a pop-up notification can be displayed that enables a user to choose whether to join a meeting session. In alternative embodiments., the devices could first be sent as request to join a resumed meeting session, and then meeting-session data would only be transmitted to a given device after the device has indicated a desire to join a resumed meeting session.

After receiving an indication that the meeting session is to be resumed, a device can use the meeting-session data to configure itself to be in the same, or substantially the same, state as when the meeting session was paused (step 850). The meeting-session data can be used to select and configure various applications running at the time when the meeting session was paused. Thus, for example, a device could be used for a variety of purposes after a meeting session is paused such that a variety of different applications are running ma variety of different states, but then brought back to the state it was in when the meeting session was paused.

In some embodiments a shared file, such as a slide how, will have been worked during a meeting session. Alter a meeting session is paused, in some embodiments the shared file can be modified. In such embodiments, a plurality of versions of the shared file could be stored, such as, for example, the version of the file when the meeting session was paused and the latest version of the file, or a version of the file for each time the file is modified. Further, in such embodiments, the meeting-session data could include a version ID of the file representative of the version of the file at the time when the meeting session was paused. After a device is configured for a resumed meeting session. The device can load the version of the file that existed when the meeting session was paused in the state the file was in when the meeting session was paused. Alternatively, in some embodiments, the device can load any stored version of the file. for example, by displaying a pop-up notification that enables a user to choose which version of the file to load.

After a device is properly configured, or while a device is being properly configured, the device can connect to the resumed meeting session (step 860).

Figure 9:
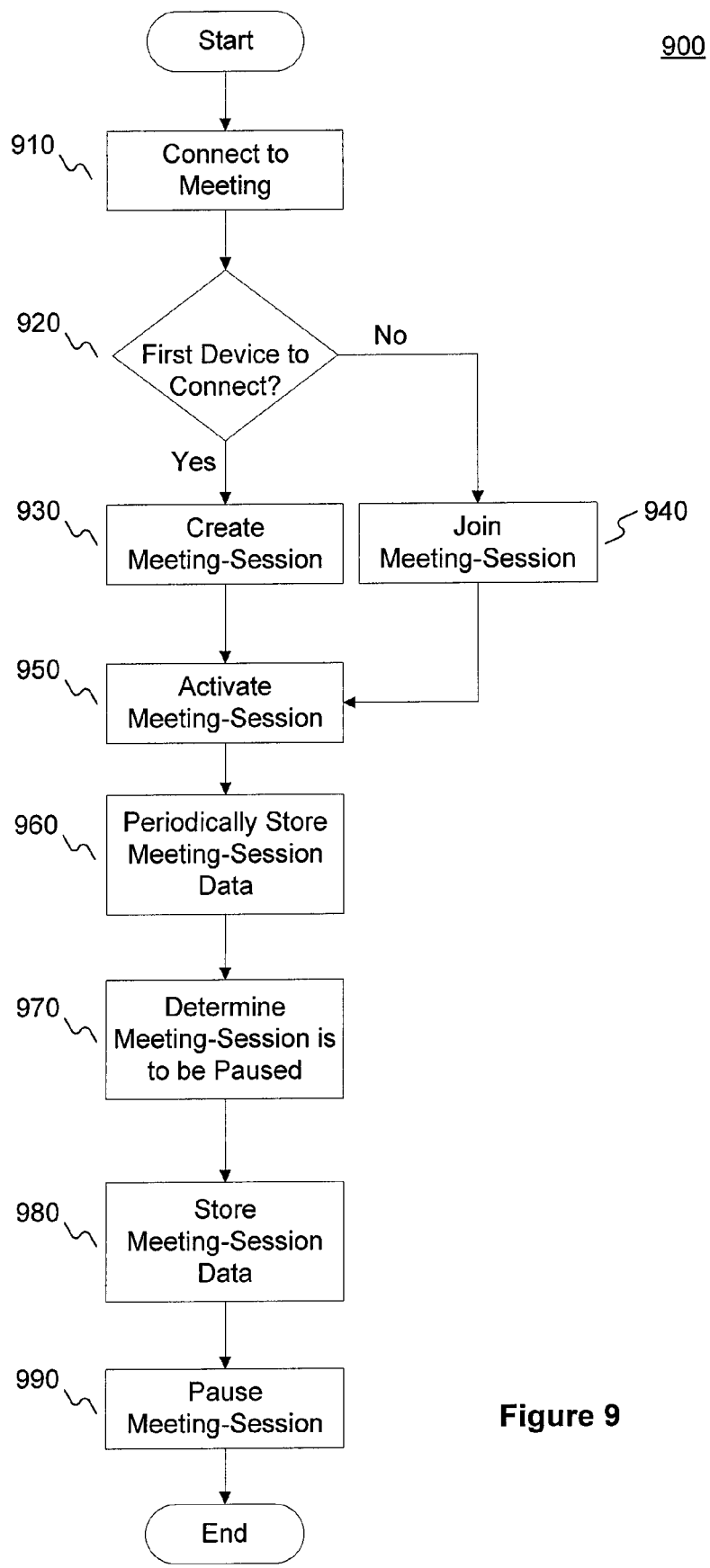
FIG. 9 is a flow diagram of an example method for creating, connecting to and pausing a meeting session, in accordance with an example embodiment.

Reference is now made to FIG. 9, which illustrates an example method 900 for creating, connecting to, and pausing a meeting session, in accordance with an example alternative embodiment. Steps 910-950 and 970-990 of FIG. 9 operate in essentially the same manner as steps 710-780 of FIG. 7, respectively. However, method 900 includes the additional step of, during an active meeting session, periodically storing meeting-session data (step 960). The periodic storage of meeting-session data can operate in substantially the same manner as the final storage of meeting-session data when the meeting session is paused. In alternative embodiments, the periodic storage of meeting-session data will only store a subset of the types of data stored during the final storage of meeting-session data, such as, for example, only storing the types of applications running in the meeting session.

Figure 10:
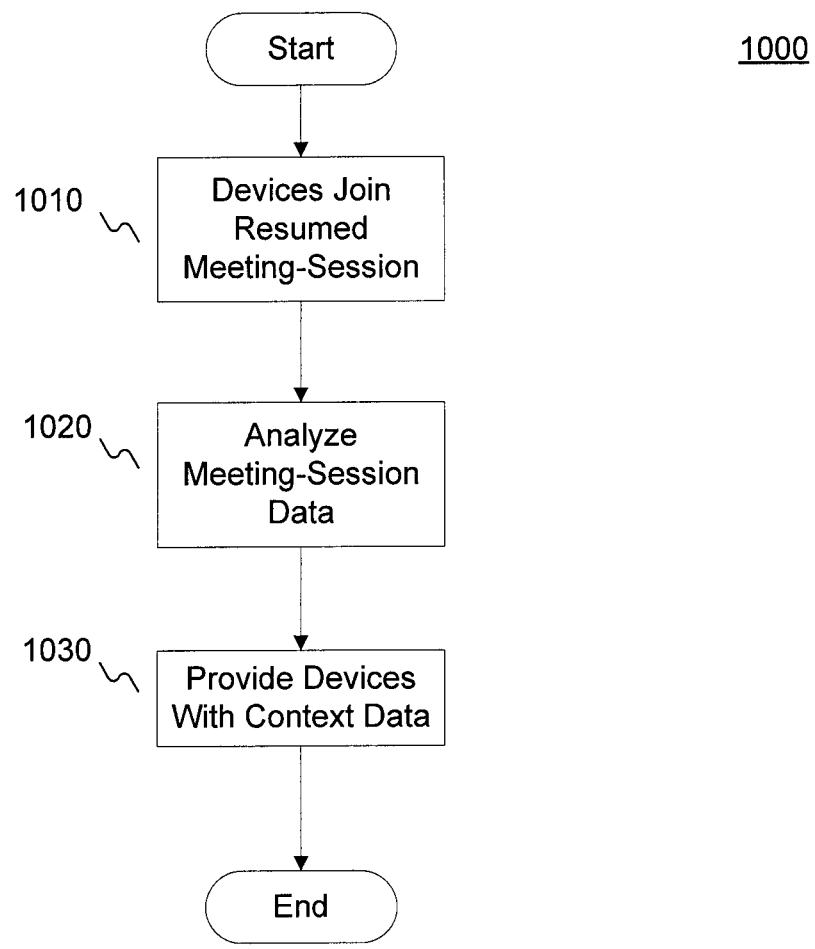
FIG. 10 is as flow diagram of an example method for providing context data to a resumed meeting session, in accordance with an example embodiment.

In embodiments where periodic storage of meeting-session data is utilized a device reconnecting to a meeting session, in addition to being provided meeting-session data that can be used to configure the device, can be provided with context data, as depicted in method 1000 of FIG. 10 (steps 1010-1030). For example, the context data provided after a meeting session is being resumed could include data regarding files that had previously been accessed h an application in the meeting session. Thus, for example, if a meeting session is resumed in a state such that a slideshow application is displaying a certain slide, context data could be provided regarding past slideshows that have already been viewed.

Certain adaptations and modifications of the described embodiments can be made. Therefore, the above discussed embodiments arc considered to be illustrative and not restrictive.

Embodiments of the present application are not limited to any particular operating system, mobile device architecture, server architecture, or computer programming language.

What is claimed is:

1. A method comprising:
 creating meeting-session data based at least in part on one or more applications running on one or more devices connected to a meeting session, the meeting-session data including one or more device IDs corresponding to the one or more devices and further including data linking the one or more applications to the one or more device IDs;
 pausing the meeting session; and
 resuming the meeting session, at least in part, by configuring at least one of the one or more devices to run at least one of the one or more applications using the meeting-session data.

2. The method of claim 1, wherein the meeting-session data is further created based at least in part on a state of the one or more applications running on the one or more devices connected to the meeting session.

3. The method of claim 2, wherein the meeting-session data is further created based at least in part on a meeting-session ID.

4. The method of claim 2, wherein the meeting-session data is further created based at least in part on a version ID of a file open in at least one of the one or more applications, wherein configuring at least one of the one or more devices when resuming the meeting session further includes:
 loading a version of the file corresponding to the version ID; and
 running the one or more applications in the state of the one or more applications prior to, or during, the pausing of the meeting session.

5. The method of claim 1, wherein the meeting-session data is further created based, at least in part, on data acquired at a plurality of different times during the meeting session, wherein resuming the meeting session further includes:
 providing the configured devices with context information created by analyzing changes in the meeting-session data over time.

6. The method of claim 1, wherein resuming the meeting session fu her includes:
 providing the one ear more devices with a notification that the meeting session is being resumed; and
 enabling the one or more devices to determine whether to join the resumed meeting session.

7. The method of claim 1, further comprising:
 detecting a predetermined change in location of at least one of the one or more devices and, responsive thereto, pausing of the meeting session.

8. A device comprising:
 one or more processors;
 one or more memories;
 program code stored on the one or more memories, which, when executed by the one or more processors, cause the device to perform a method of:
 creating meeting-session data based at least in part on one or more applications running on one or more devices connected to a meeting session, the meeting-session data including one or more device IDs corresponding to the one or more devices, and further including data linking the one or more applications to the one or more device IDs;
 pausing the meeting session; and
 resuming the meeting session, at least in part by configuring at least one of the one or more devices to run at least one of the one or more applications using the meeting-session data.

9. The device claim 8, wherein the meeting-session data is further created based at least in part on a state of the one or more applications running on the one or more devices connected to the meeting session.

10. The device of claim 9, wherein the meeting-session data is further created based at least to part on a meeting-session ID.

11. The device of claim 9, wherein the meeting session data is further created based at least in part on a version ID of a file open in at least one of the one or more applications, wherein configuring at least one of the one or more devices when resuming the meeting session further includes:
 loading a version of the file corresponding to the version ID; and
 running the one or more applications in the state of the one or more applications prior to, or during, the pausing of the meeting session.

12. The device of claim 8, wherein the meeting-session data is further created based at least in part on data acquired at a plurality of different times during the meeting session, wherein resuming the meeting session further includes:
 providing the configured devices with context information created by analyzing changes in the meeting-session data over time.

13. The device of claim 8, wherein resuming the meeting session further includes:
 providing the one or ore devices with a notification that the meeting session is being resumed; and
 enabling the one or more devices to determine whether to join the resumed meeting session.

14. The device of claim 8, further comprising program code operable, when executed by one or more processors, to perform:
 detecting a predetermined change in location of at least one of the one or more devices and, responsive thereto, performing the pausing of the meeting session.

15. A device comprising:
one or more processors configured to execute modules; and
one or more memories storing the modules, the modules comprising:
- a data storage and retrieval module configured to communicate with a database;
- a state monitoring module configured to monitor one or more applications; and
- a control module configured to communicate with the data storage and retrieval module and the state monitoring module, and to:
  - create meeting-session data based at least in part on the one or more applications running on one or more devices connected to a meeting session, the meeting-session data including one or more device IDs corresponding to the one or more devices, and further including data linking the one or more applications to the one or more device IDs;
  - pause the meeting session; and
  - resume the meeting session, at least in part, by configuring at least one of the one or more devices to run at least one of the one or more applications using the meeting session data.

16. The device of claim 15, wherein the meeting-session data is further created based at least in part on a state of the one or more applications running on the one or more devices connected to the meeting session.

17. The device of claim 16, wherein the meeting session data is further created based at least in part on a version ID of a file open in at least one of the one or more applications, wherein configuring at least one of the one or more devices when resuming the meeting session further includes:
- loading a version of the file corresponding to the version ID; and
- running the one or more applications in the state of the one or more applications prior to, or during, the pausing of the meeting session.

18. The device of claim 15, wherein the meeting-session data is further created based at least in part on data acquired at a plurality of different times during the meeting session, wherein resuming the meeting session further includes:
- providing the configured devices with context information created by analyzing changes in the meeting-session data over time.

19. The device of claim 15, wherein resuming the meeting session further includes:
- providing the one or more devices with a notification that the meeting session is being resumed; and
- enabling the one or snore devices to determine whether to join the resumed meeting session.

20. The device of claim 15, wherein the control module is further configured to:
- detect a predetermined change in location of at least one of the one or more devices and, responsive thereto, pause the meeting session.

* * * * *

UNITED STATES PATENT AND TRADEMARK OFFICE
CERTIFICATE OF CORRECTION

| | | |
|---|---|---|
| PATENT NO. | : 8,977,688 B2 | Page 1 of 1 |
| APPLICATION NO. | : 14/163777 | |
| DATED | : March 10, 2015 | |
| INVENTOR(S) | : Marcus Eriksson et al. | |

It is certified that error appears in the above-identified patent and that said Letters Patent is hereby corrected as shown below:

Title page, item (57)

(Abstract), Line 3, Delete "in pan" and insert -- in part --, therefor.

(Abstract), Line 5-6, Delete "muting-session" and insert -- meeting-session --, therefor.

In the Specification

Column 1, Line 11, Delete "2012,which" and insert -- 2012, which --, therefor.

In the Claims

Column 12, Line 5, In Claim 6, delete "fu her" and insert -- further --, therefor.

Column 12, Line 6, In Claim 6, delete "ear" and insert -- or --, therefor.

Column 12, Line 32, In Claim 9, delete "device claim" and insert -- device of claim --, therefor.

Column 12, Line 37, In Claim 10, delete "to part" and insert -- in part --, therefor.

Column 12, Line 58, In Claim 13, delete "one or ore" and insert -- one or more --, therefor.

Column 13, Line 23, In Claim 15, delete "meeting session" and insert -- meeting-session --, therefor.

Column 14, Line 21, In Claim 19, delete "snore" and insert -- more --, therefor.

Signed and Sealed this
Fifteenth Day of September, 2015

Michelle K. Lee
*Director of the United States Patent and Trademark Office*